US 8,211,255 B2

(12) United States Patent
Detert et al.

(10) Patent No.: US 8,211,255 B2
(45) Date of Patent: Jul. 3, 2012

(54) APPARATUS AND METHODS FOR THE ATTACHMENT OF MATERIALS TO POLYURETHANE FOAM, AND ARTICLES MADE USING THEM

(75) Inventors: James W. Detert, Brunswick, ME (US); Jonathan Stormont, Dresden, ME (US); Fred Libby, Waldoboro, ME (US); T. Scott Kennedy, East Boothbay, ME (US); Herbert Winicov, East Boothbay, ME (US)

(73) Assignee: Rynel Inc., Wiscasset, ME (US)

( * ) Notice: Subject to any disclaimer, the term of this patent is extended or adjusted under 35 U.S.C. 154(b) by 249 days.

(21) Appl. No.: 12/134,319

(22) Filed: Jun. 6, 2008

(65) Prior Publication Data

US 2009/0008021 A1 Jan. 8, 2009

Related U.S. Application Data

(63) Continuation of application No. 10/829,919, filed on Apr. 21, 2004, now abandoned.

(60) Provisional application No. 60/464,306, filed on Apr. 21, 2003.

(51) Int. Cl.
 *B32B 38/00* (2006.01)
 *B32B 37/12* (2006.01)
 *B32B 38/10* (2006.01)
(52) U.S. Cl. ........ 156/73.1; 156/60; 156/73.6; 156/249; 156/331.7
(58) Field of Classification Search .................. 156/73.1, 156/60, 73.6, 249, 331.7
See application file for complete search history.

(56) References Cited

U.S. PATENT DOCUMENTS

| | | | |
|---|---|---|---|
| 3,196,062 A | 7/1965 | Kristal | |
| 3,652,747 A | 3/1972 | Sirota et al. | |
| 4,082,703 A | 4/1978 | Duffy et al. | |
| 4,372,303 A * | 2/1983 | Grossmann et al. | 128/851 |
| 4,403,083 A * | 9/1983 | Marans et al. | 528/44 |
| 4,603,076 A | 7/1986 | Bowditch et al. | |
| 4,610,751 A | 9/1986 | Eschler et al. | |
| 4,799,318 A * | 1/1989 | Hansson | 34/117 |
| 4,828,542 A | 5/1989 | Hermann | |
| 4,897,935 A | 2/1990 | Fel et al. | |
| 4,940,047 A | 7/1990 | Richter et al. | |
| 4,990,339 A | 2/1991 | Scholl et al. | |
| 5,013,382 A | 5/1991 | Nalowaniec et al. | |
| 5,045,389 A | 9/1991 | Campagna | |
| 5,064,653 A | 11/1991 | Sessions et al. | |
| 5,065,752 A | 11/1991 | Sessions et al. | |
| 5,133,821 A * | 7/1992 | Jensen | 156/245 |
| 5,135,472 A | 8/1992 | Hermann et al. | |
| 5,180,495 A | 1/1993 | Thuer et al. | |
| 5,254,301 A | 10/1993 | Sessions et al. | |

(Continued)

FOREIGN PATENT DOCUMENTS

AU A-56447/94 12/1994

(Continued)

*Primary Examiner* — Katarzyna Wyrozebski Lee
*Assistant Examiner* — Daniel Lee
(74) *Attorney, Agent, or Firm* — Alan W. Steele; Foley Hoag LLP

(57) ABSTRACT

One aspect of the present invention relates to a laminated foam product, wherein the adhesive binding the foam to the laminate comprises the mixture from which the foam is made. Another aspect of the present invention relates to methods for making a laminated foam product. A third aspect of the present invention relates to an apparatus for making a laminated foam product.

5 Claims, 5 Drawing Sheets

U.S. PATENT DOCUMENTS

| | | | |
|---|---|---|---|
| 5,266,323 A | 11/1993 | Guthrie et al. | |
| 5,300,248 A | 4/1994 | Passler et al. | |
| 5,458,926 A * | 10/1995 | VerMehren | 427/207.1 |
| 5,844,013 A | 12/1998 | Kenndoff et al. | |
| 5,914,282 A | 6/1999 | Dunshee et al. | |
| 5,916,928 A * | 6/1999 | Sessions et al. | 521/155 |
| 5,951,796 A * | 9/1999 | Murray | 156/78 |
| 5,973,221 A | 10/1999 | Collyer et al. | |
| 6,043,406 A | 3/2000 | Sessions et al. | |
| 6,218,321 B1 | 4/2001 | Lorcks et al. | |
| 6,346,653 B1 | 2/2002 | Sessions et al. | |
| 6,447,802 B2 | 9/2002 | Sessions et al. | |
| 6,451,301 B1 | 9/2002 | Sessions et al. | |
| 6,509,388 B1 | 1/2003 | Addison et al. | |
| 6,617,014 B1 | 9/2003 | Thomson | |
| 6,617,031 B1 * | 9/2003 | Glasbrenner | 428/423.1 |
| 7,091,394 B2 | 8/2006 | Kolte et al. | |
| 2002/0094432 A1 | 7/2002 | Herzog et al. | |
| 2002/0148427 A1 | 10/2002 | Jones et al. | |
| 2003/0149406 A1 | 8/2003 | Martineau et al. | |
| 2004/0018227 A1 | 1/2004 | Park et al. | |

FOREIGN PATENT DOCUMENTS

| | | |
|---|---|---|
| DE | 19507637 | 8/1996 |
| DE | 19909978 | 9/2000 |
| DE | 10010269 | 7/2001 |
| DE | 10010268 | 9/2001 |
| EP | 0059048 A1 | 9/1982 |
| EP | 0099748 A1 | 2/1984 |
| EP | 0106439 A1 | 4/1984 |
| EP | 0335669 A2 | 10/1989 |
| EP | 0424164 A2 | 4/1991 |
| EP | 0730875 A2 | 9/1996 |
| EP | 0741002 A2 | 11/1996 |
| EP | 1279762 A2 | 1/2003 |
| GB | 2369799 | 7/1925 |
| GB | 1171932 | 11/1969 |
| WO | WO-9003155 | 4/1990 |
| WO | WO-0125523 | 4/2001 |
| WO | WO-0239940 A2 | 5/2002 |
| WO | WO-2004076154 | 9/2004 |

* cited by examiner

APPARATUS AND METHODS FOR THE ATTACHMENT OF MATERIALS TO POLYURETHANE FOAM, AND ARTICLES MADE USING THEM

RELATED APPLICATIONS

This application is a continuation of U.S. patent application Ser. No. 10/829,919, filed Apr. 21, 2004, now abandoned; which claims the benefit of U.S. Provisional Patent Application Ser. No. 60/464,306, filed Apr. 21, 2003; both of which are herein incorporated by reference in their entireties.

BACKGROUND OF THE INVENTION

Composite articles having a plurality of layers, especially those used to make wound dressings, garments, and industrial composites, could be vastly improved if there was a method for adhering the substrate to the foam layer while still maintaining the malleability and characteristics, e.g., biocompatibility, of the original foam. For example, it has been difficult to construct safe, durable wound dressings. Moreover, industrial composite articles with increased durability, malleability and strength have been sought for many years. What is needed is a method of adhering the substrate to the polymer foam without adversely affecting the desired properties of the original untreated foam or substrate, e.g., biocompatibility or moisture vapor transfer rate.

Methods for achieving adhesion between layers of a composite material typically involve a combination of surface modification techniques. Several types of surface modification exist. One type of surface modification is to bind covalently a modifier to a surface of a substrate material. This binding can be achieved in many different ways, such as chemical grafting onto the surface of the substrate through condensation or high energy addition reactions, or oxidizing the substrate away leaving a covalently bound modified surface. Covalently bound modifiers are usually the most durable surface modifications. However, such techniques are complicated, expensive and often environmentally hazardous to employ. Another type of surface modification is to cause an association or entrapment of the modifying molecule (or part of the molecule) with the substrate material. This commingling of modifier molecules and substrate relies on molecular attractions, such as van der Waals forces, dipole-dipole interactions, hydrogen bonding, as well as steric factors to hold the modifier in/on the surface of the substrate. The factors that effect this type of reaction are similar to those that effect thermosol dyeing or blooming. Still another type of surface modification involves the retention of modifier by substrate with only adhesive and cohesive forces between the modifier to the substrate and the modifier to itself, respectively.

Methods for improving adhesion between substrate and polymer layers have previously come at the expense of other qualities, such as durability, malleability, the environment, or performance characteristics. Addressing one aspect of desired qualities usually results in sacrificing other qualities. Conventional treatments for improving adhesion between substrate and polymer layers are typically unable to solve this dilemma and fall into the general categories of (i) surface coatings; (ii) saturations or impregnations; (iii) layers of fibers and/or polymers; (iv) unique chemical compositions; and (v) combinations of the foregoing.

Coatings can be one-sided or two-sided, but tend to be step gradients from one surface through the width of the substrate being treated, as opposed to homogeneous materials or continuous gradients. A step gradient has certain intrinsic disadvantages, due mostly to the fact that the coating composition contacts the substrate at one surface, thereby causing a substrate/coating-composition interface. Adhesion at the substrate/coating-composition interface derives mostly from surface forces, less than optimal mechanical interlocking, and sometimes little to no contribution from the cohesive strength of the modifying or coating material. Secondly, because of the disparate materials plied together, the resultant tactile properties of the composite (e.g., hand, drape) are usually distinctly different than the base fabric. Typically, this interface tends to separate upon prolonged exposure to moisture or upon high stress conditions.

Several references describe laminates or layers of fabrics and/or polymers. Laminations use an adhesive tie coat to keep a film in contact with the fabric surface. This technique exhibits the same limitations described above for coatings, as well as environmental issues with the adhesives and any other part of the film preparation process. Additional difficulties are encountered in ensuring that the mechanical performance differential between the substrate, adhesive, and film is balanced. For example, if shrinkage of any of the three materials passes the initial yield stress of either of the other materials, there will be deformation; further, if it passes the ultimate tensile strength, there will be delamination of the composite. U.S. Pat. Nos. 4,872,220; 5,024,594; 5,180,585; 5,335,372; and 5,391,423; describe articles that use layers of fabrics and/or polymers to prevent blood, microbes, and viruses from penetrating through the fabrics. Similarly, U.S. Pat. No. 4,991,232 describes a medical garment comprising a plurality of plies to prevent blood from penetrating through the garment. Layers of fabrics and/or polymers traditionally result in heavier garments and utilize additional raw materials. Moreover, the coating of a polymer upon a web which has been treated by the above techniques, exhibits the same limitations as discussed above.

Some layering techniques, particularly related to industrial composites, require a combination of steps to improve adhesion and/or obtain multiple layers of polymer and fabrics while shaping the article. U.S. Pat. No. 3,762,978 describes a process for preparing a surface of a cured silicone polymer with a mineral acid for the purpose of adhering another uncured silicone polymer composition. This technique requires specific compositions and is not universally available for all compositions. Moreover, the technique relies on an initial silicone polymer coating, having the limitations of coatings discussed above.

Most industry efforts to improve adhesion of one layer to another have focused primarily on the chemistry involved in adhesion. Many patents, too numerous to cite, involve unique chemical compositions; each composition has unique abilities and limitations related to adhesion, durability and/or other performance characteristics. A sampling of patents related to unique compositions for improved adhesion comprise U.S. Pat. Nos. 4,681,808; 5,292,586; 5,360,852; 5,416,144; 5,374,485; 5,342,870; 4,525,400; 4,483,973; 5,308,887; 5,190,827; 5,175,058; 5,175,057; 5,128,394; 5,096,981; 5,028,485; 4,988,779; 4,794,192; 5,436,303; 5,399,614; 5,714,265; 4,918,126; 4,205,559; 5,023,288; 4,942,093, 5,503,940, 5,700,532; European Publication No. 0 491 483 A1; and an article by Stein et al., in Macromolecules, 19: 2291-2294, 1986. Most of these references identify specific chemical moieties related to adhesion. Two such patents, U.S. Pat. Nos. 5,714,265 and 5,700,532 describe the use of two different curing agents, a platinum-based catalyst polymer and a peroxide-based catalyst polymer, interacting to create an improved adhesion.

What is needed in the art is a single method for adhering the substrate to the polymer foam while preserving the durability, malleability, and characteristics of the substrate and polymer foam.

SUMMARY OF THE INVENTION

One aspect of the present invention relates to a method of binding a substrate to a hydrophilic or hydrophobic polyurethane foam using an adhesive, wherein the adhesive is a precursor of a hydrophilic or hydrophobic polyurethane foam, respectively. In certain embodiments, the adhesive is applied to a localized area of the substrate, followed by spreading the adhesive foam precursor across the surface of the substrate by pressing a temporary casting surface onto the substrate surface bearing the adhesive. Then before the adhesive is fully cured, the casting surface is removed and the polymeric foam is pressed onto the surface of the substrate coated with the adhesive. Alternatively, the adhesive foam precursor is sprayed onto the substrate followed by direct addition of the foam material to the surface of the substrate coated with the adhesive foam. This process is advantageous because it does not require an additional step to distribute the adhesive foam precursor on the substrate. A method that utilizes an adhesive foam precursor as an adhesive is advantageous because it offers a superior bonding performance without damaging, e.g., by heating, the foam or substrate to be bound to the foam. This advance is particularly important for hydrophilic or hydrophobic polyurethane foams because it can be difficult to find non-toxic, durable adhesives to bond materials to these types of foam that do not alter the characteristics of the material.

Another aspect of the present invention relates to an apparatus used in the production of the composite foam material. This apparatus generally comprises: spindles that contain the substrate and foam feedstock, a roller which supports the materials to be bonded; a spray gun for application of the adhesive; a roller to guide application of the polymeric foam; and a spindle to collect the foam-substrate composite product. This apparatus offers the advantage that the adhesive foam can be rapidly applied in a substantially uniform manner and does not require an additional step or materials to distribute the adhesive.

Another aspect of the present invention relates to a material comprising a polymeric hydrophilic foam bound to a substrate by an adhesive, wherein the adhesive is a hydrophilic polyurethane foam precursor that cures to become such a hydrophilic foam. The composition of the adhesive foam may be the same or different than the composition of the polymeric hydrophilic foam bound to the substrate. This composite material has superior physical properties compared to composite materials formed using traditional non-porous/non-hydrophilic adhesives and is less toxic than some hydrophilic polymer adhesives cured by exposure to humidity. For example, the adhesive foam of the present invention prevents the composite material from containing a "hard" layer that often causes discomfort for a patient wearing a medical garment or wound dressing made of such a composite material. In addition, traditional adhesives can reduce the moisture vapor transmission rate (MVTR) through the adhesive layer and trap the fluid in the foam. The fluid may arise from perspiration or from liquid exuded from the wound. The buildup of fluid in the foam is mitigated when the adhesive is also a foam that allows for moisture vapor transmission. The use of foam adhesives is advantageous because some hydrophilic foams are known to swell when wet (for example, approx. 20-30% each dimension or more) and the use of a foam adhesive ensures that the adhesive will swell in proportions similar to that of the bulk foam component of the composite material. This property effectively prevents a "bimetallic strip" effect, such as curling and cupping of the composite material (e.g., medical garment).

Another aspect of the present invention relates to a material comprising a polymeric hydrophobic foam bound to a substrate by an adhesive, wherein the adhesive is a hydrophobic polyurethane foam precursor that cures to become such a hydrophobic foam. The composition of the adhesive foam may be the same or different than the composition of the polymeric hydrophobic foam bound to the substrate.

The use of a polyurethane foam adhesive layer is also advantageous because regulatory approval requirements can arise when a new material (e.g., an adhesive) is introduced into an approved product (e.g., a medical foam). Hence, utilization as an adhesive of a foam that has already been approved for medical use would reduce costs associated with approval of the composite material for medical use.

Another aspect of the present invention relates to a composition comprising a substrate coated with a thin layer of a hydrophilic polyurethane foam. In a preferred embodiment, the hydrophilic polyurethane foam is prepared from a prepolymer mixture of Trepol®, HYPOL™, or Prepol. The substrate is a textile or non-woven material. In a preferred embodiment, the substrate is cotton, wool, linen, rayon, or nylon. The composite materials of the invention readily transmit moisture vapor and will be particularly useful in the preparation of various garments, blankets, protective barriers, and wound dressings.

DETAILED DESCRIPTION OF THE INVENTION

Figure 1:
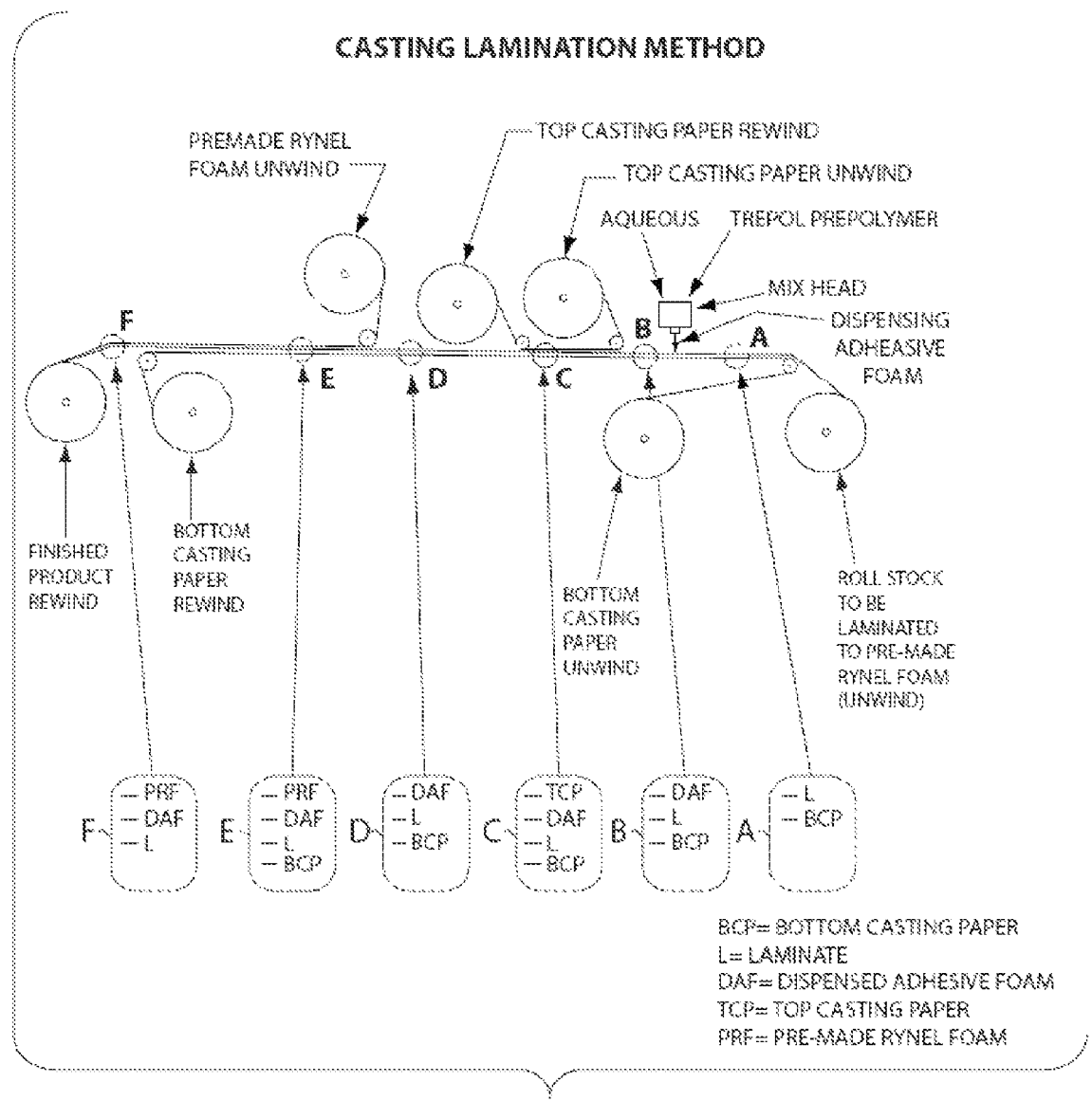
FIG. 1 depicts a schematic drawing of the Casting Lamination Method.

The invention will now be described more fully with reference to the accompanying examples, in which certain preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Overview of a Preferred Embodiment

One aspect of the present invention relates to a method for adhering a substrate to a hydrophilic or hydrophobic polyurethane foam while maintaining the durability, malleability, and characteristics of the substrate and polymer foam. The method generally relates to binding a substrate to a hydrophilic or hydrophobic polyurethane foam using an adhesive, wherein the adhesive is a precursor of a hydrophilic or hydrophobic polyurethane foam, e.g., a prepolymer mixture that upon curing becomes such a foam. In certain embodiments, the adhesive is applied to a localized area of the substrate and subsequently spread across a surface of the substrate by pressing a temporary casting surface onto the substrate surface containing the adhesive. Then before the adhesive is fully cured, the casting surface is removed and the polymeric foam is pressed onto the surface of the substrate that contains the adhesive residue. It is important to note that in this method the adhesive could be applied to the substrate by many different mechanisms including application by brush, spraying, or controlled pouring through a nozzle.

Alternatively, a preferred embodiment has been developed wherein the adhesive is sprayed onto the substrate followed by addition of the foam material to the surface of the substrate containing the adhesive foam. This process is advantageous because it does not require additional steps to distribute the adhesive. A method that utilizes an adhesive foam offers a superior bonding performance without damaging the foam or substrate to be bound to the foam. This advance is particularly important for hydrophilic and hydrophobic polyurethane foams because it can be difficult to find non-toxic, durable adhesives to bond materials to this type of foam that do not alter the characteristics of the materials. In certain embodiments, when the substrate is a foam, the foam can be manufactured and then bonded to a second substrate using an adhesive as part of one production line. In other instances, the foam substrate is manufactured on one production line, and then the foam substrate is bonded to a second substrate in a process conducted on a second production line. In addition, each method described above allows for the introduction of an additional material (e.g. a scrim or adsorbent) to be applied to the substrate along with the adhesive. This allows one skilled in the art to tune the physical properties of the product to better meet the needs of a specific application.

Another aspect of the present invention relates to an apparatus used in the production of the composite hydrophilic or hydrophobic foam material. This apparatus generally comprises: spindles that contain the substrate and foam feedstock, a roller which supports materials to be bonded; a spray gun for application of the adhesive; a roller to guide application of the polymeric foam; and a spindle to collect the foam-substrate composite product. The latter apparatus offers the advantage that the adhesive foam can be rapidly applied and does not require additional steps or materials to distribute the adhesive.

Another aspect of the present invention relates to a material comprising a hydrophilic or hydrophobic polymeric foam bound to a substrate by an adhesive wherein the adhesive is a hydrophilic or hydrophobic polyurethane foam. The composition of the adhesive foam is the same or different than the composition of the polymeric foam bound to the substrate. This composite material has superior physical properties compared to composite materials formed using traditional non-porous/non-hydrophilic adhesives. For example, the adhesive foam of the present invention prevents the composite material from containing a "hard" layer that often causes discomfort for a patient wearing a medical garment of such a composite material.

Moreover, in the context of hydrophilic foams, traditional adhesives can reduce the moisture vapor transmission rate (MVTR) through the adhesive layer and trap the fluid in the foam. The build-up of fluid in the foam is mitigated when the adhesive is also a foam that allows for moisture vapor transmission. The use of foam adhesives is advantageous because some hydrophilic foams are known to swell when wet (for example, approx. 20-30% each dimension or more) and the use of a foam adhesive ensures that the adhesive will swell in proportions similar to that of the bulk foam component of the composite material. This property effectively prevents a "bimetallic strip" effect such as curling and cupping of the composite material (e.g., medical garment). The use of foam adhesives are also advantageous because regulatory problems can arise anytime a new material (adhesive) is introduced into a product (foam) that is already deemed acceptable for medical use. Hence, utilization of a foam that has been preapproved for medical use would reduce costs associated with approval of the composite material for medical use.

Another aspect of the present invention relates to a composition comprising a substrate coated with a thin layer of a hydrophilic polyurethane foam. The polyurethane foam is prepared from a prepolymer mixture of Trepol®, HYPOL™, Prepol, Hydropol, Aquapol, or Urepol. In certain embodiments, the substrate is a textile or non-woven material. The substrate is characterized in that moisture is able to pass through the substrate. Moreover, the Applicant's have surprisingly discovered that the presence of a thin layer of hydrophilic polyurethane foam increases the moisture vapor transmission rate of the substrate to which the foam is attached. In a preferred embodiment, the substrate is cotton, wool, linen, rayon, or nylon. The composite materials of the invention readily transmit water vapor and can be used in the preparation of various articles such as gloves, socks, hats, coats, pants, aprons, protective medical garments, blankets, wound dressings, and the like. It is widely recognized that garments need to be able to transmit water vapor to be comfortable, otherwise water vapor from perspiration becomes trapped causing the garment to become wet. Wet garments are uncomfortable to wear. The composite materials of the present invention have relatively high moisture vapor transition rates which prevents moisture from becoming trapped in the garment. The composite materials of the invention will be particularly useful in the preparation of garments worn by a person participating in an activity requiring physical activity, e.g., walking, running, skiing, hiking, and the like. The composite materials of the invention will also be very useful in the preparation of wound dressings. The relatively high moisture vapor transmission rate will prevent the buildup of moisture in the medical dressing, thereby preventing the medical dressing from becoming soggy.

Polymeric Foams

Hydrophilic and hydrophobic polyurethanes can be made by what is commonly referred to as the "Prepolymer Process". A prepolymer in this context is an isocyanate-capped polyol or polyurethane. In the case of hydrophobic polyurethanes, a hydrophobic polyol is used. In the case of a hydrophilic polyurethane, a hydrophilic polyol, usually a polyethylene glycol, is used. In a typical process, an aqueous phase and the prepolymer are emulsified. A chemical reaction takes place between the water in the aqueous phase and the isocyanates liberating carbon dioxide gas and polymerizing the mass, simultaneously. The quality of the foam is governed in part by the quality of the emulsion that is created. While other factors including temperature and mixing speed also influence the foam structure, it is common to use a surfactant to control foam quality. It is clear that adding another component to the formulation, particularly a surface active ingredient, will affect the foam quality. Once made, however, such hydrophilic and hydrophobic foams are known to be both chemically and physically stable.

A representative sample of suitable hydrophilic prepolymers would include polyether polyols capped with polyfunctional aromatic isocyanates, for example, toluene diisocyanate (TDI) or methylene diphenyl isocyanate (MDI), or with aliphatic isocyanates, for example, isopherone diisocyanate (IPDI) or hydrogenated methylene diphenyl isocyanate (HMDI). The polyether polyols are hydrophilic polyoxyalkylenes with a minimum of about 40 mol % ethylene oxide. Crosslinking sites are developed, when necessary, during the prepolymer formation by the addition of water to the prepolymer polyols to form urea and subsequently biuret linkages in the prepolymer, formation of allophate linkages by prolonged heating at elevated temperatures, branching of prepolymers by the addition of triols or tetrols. (for example, trimethylolpropane, glycerol, or pentaerythritol), or formation of branches by the use of selective catalysts.

Hydrophilic prepolymers can be purchased from a number of companies for use in the manufacture of foams. A representative list of prepolymers includes Trepol® sold by Rynel, HYPOL™ sold by Dow, Prepol sold by Lendell Manufacturing, Inc. (St. Charles, Mich.), Hydropol sold by Mace Adhesives & Coatings Co., Inc., Aquapol sold by Carpenter Co. (Richmond, Va.), and Urepol sold by EnviroChem. Technologies. These prepolymers are activated by contact with water and it is known that the amount of water can influence the properties of the foam. Typical prepolymer to water ratios range from about 2:1 to about 0.5:1 depending on the desired properties of the resultant polymer.

A variety of polymeric foams are amenable to the present invention. Representative examples of polymeric foams are poly(alkyloxy urethane) foams, polycarbonate foams, and poly(oxyether)polyol foams such as polyethylene glycol, polypropylene glycol, or a copolymer of polyethylene glycol and polypropylene glycol.

Recently, it has been found that hydrophilic polyurethane foams having improved wet strength properties can be prepared from a reaction mixture comprising a select mixture of three polyols. As such, these foams are of particular utility in wet cleaning and scrubbing applications. In preparing these polyurethane foams, the so-called "one-shot method" or the "prepolymer technique" may be used, the one-shot method being preferred. These foams are prepared from a reaction mixture comprised of an organic polyisocyanate, a foaming agent, a reaction catalyst, and, as the polyol reactant, a select mixture or combination of three polyether polyols. Any organic polyisocyanate which is useful in the preparation of polyurethane foams can be employed in practicing the process. This includes, for example, toluene diisocyanate, such as the 80:20 mixture or the 65:35 mixture of the 2,4- and 2,6-isomers, ethylene diisocyanate, propylene diisocyanate, methylene-bis-4-phenyl isocyanate, 3,3'-bitoluene-4,4'-diisocyanate, hexamethylene diisocyanate, naphthalene-1,5-diisocyanate, polymethylene polyphenylisocyanate, mixtures thereof and the like. A preferred organic polyisocyanate is an aromatic diisocyanate, such as TDI or MDI. The amount of polyisocyanate employed in a process should be sufficient to provide in the range of about one isocyanate group per hydroxyl group present in the reaction system, which includes all the polyol reactants as well as any additive or foaming agent employed. An excess of isocyanate compound may be conveniently employed; however, this is generally undesirable due to the high cost of the isocyanate compounds. It is preferable, therefore, to employ sufficient isocyanate to provide no greater than about 1.25 isocyanate groups per hydroxyl group, and preferably between about 0.9 and about 1.2 isocyanate groups per hydroxyl group. The ratio of isocyanate to OH group times 100 is referred to as the "index." See the following U.S. patents for additional examples: U.S. Pat. No. 3,194,773, No. 3,238,273, No. 3,336,242, No. 3,380,967, No. 3,461,086, No. 3,457,203, No. 3,546,145, and No. 3,457,203.

A variety of surfactants are known in the art and are amenable to the present invention. One type of surfactant is a silicone-based surfactant. Silicone surfactants known in the art include: "hydrolysable" polysiloxane-polyoxyalkylene block copolymers, "non-hydrolysable" polysiloxane-polyoxyalkylene block copolymers, cyanoalkylpolysiloxanes, alkylpolysiloxanes, polydimethylsiloxane, and polyoxyalkylene-modified dimethylpolysiloxanes. The type of silicone surfactant used and the amount required depends on the type of foam produced as recognized by those skilled in the art. Silicone surfactants can be used as such or dissolved in solvents such as glycols. Other types of surfactants amenable to the present invention relate to anionic surfactants such as salts of fatty acids, salts of sulfuric acid esters, salts of phosphoric acid esters and sulfonates, and the like. Certain preferred surfactants are Triton materials marketed by Union Carbide, Tergitol materials marketed by Union Carbide, Emerest materials marketed by Henkel Corp., Emulgade materials marketed by Henkel Corp., Cocamide MEA marketed by Chemron, Pluronic materials marketed by BASF, Brij 72 marketed by ICI, and Sodium alpha olefin sulfonate marketed by Witco.

Adhesive

A variety of adhesives have been used for binding substrates to foam materials. A representative sample would include silicones, hydrophilic and hydrophobic polyurethanes, fluorosilicones, silicone-modified polyurethanes, acrylics, polytetrafluoroethylene (PTFE), PTFE-containing materials, neoprenes, high consistency rubbers (HCR), polycarbonates, and combinations thereof.

The use of a foam adhesive in the present invention offers a number of advantages. First, introduction of a traditional adhesive to the foam component can present compatibility problems. The "adhesive" can be toxic, cause the foam to yellow, or make the foam stiff. Therefore, it can be advantageous to use an adhesive that is of a similar or the same composition as the foam itself. Second, it is known that some hydrophilic foams will swell when wet (for example, approx. 20-30% each dimension or more), whereas a traditional adhesive material does not undergo similar distortions. Hence, it would be advantageous to have an adhesive material, such as a foam, that swells the same amount as the bulk foam component to prevent a "bimetallic strip" effect (e.g., curling or cupping). Third, the use of an adhesion foam that has the same composition as the bulk foam component can minimize regulatory problems for medical products. This later point is a significant improvement over existing adhesives wherein addition of the adhesive component to the foam to generate the product may require extensive clinical trials and expensive lab work before approval for use in medical products. Fourth, typical adhesives are non-porous/non-hydrophilic; this characteristic can reduce the moisture vapor transmission rate (MVTR) through the adhesive layer and trap the fluid in a hydrophilic foam. Most medical wound dressing applications, which call for a hydrophilic foam, depend on some MVTR through the dressing for proper wound management. Products that have an hydrophilic adhesive and hydrophilic foam that are of the same composition will have similar MVTR throughout the whole structure. Fifth, some traditional adhesives form a hard layer upon curing. The use of an adhesive layer that is similar to or the same composition as the base foam itself prevents such a "hard" layer, resulting in a softer more conformable material. Finally, certain polyurethane prepolymer mixtures give off toxic by-products upon curing with moisture.

The hydrophilic and hydrophobic adhesives used in the methods and composites of the present invention offer two additional advantages over the use of traditional adhesives. First, the foam adhesives used in methods of the present invention do not require harsh conditions to initiate curing of the adhesive. This stands in contrast to traditional adhesives that often require heating that can damage the materials being bonded together. Importantly, the present invention allows the use of prefabricated foam rather than casting directly onto the laminate (substrate). See U.S. Pat. No. 5,254,301. The method using the prefabricated foam minimizes the amount of costly laminate that could be wasted as scrap in the foaming process. The foam adhesives used in the present invention may include any of the foam compositions listed above for the composition of the bulk foam component. In addition, Trepol® foam has been shown to have superior properties for medical applications; therefore, it constitutes a preferred adhesive.

Substrate

In general, the substrate, e.g., laminate, may be any of a multitude of materials including plastic, metal fiber, wood fiber, glass, fiberglass, and textiles. Representative examples include: cotton, wool, silk, jute, linen, rayon, acetate, polyesters, polyethyleneterephthalate, polyamides, nylon, acrylics, olefins, aramids, azlons, glasses, fiberglass, modacrylics, novoloids, nytrils, rayons, sarans, spandex, vinal, vinyon, foams, films, foamed sheets, natural leathers, split hides, synthetic leathers, vinyl, urethane, polyurethane, polyurethane films, polyethylene, polymeric silicon layers, filtration membranes, polysulfones, polyimides, nitrocellulose, cellulose acetate, cellulose, and regenerated cellulose, alginates, hydrocolloids, metalized films, foils, silicones, latex, polycarbonates, and combinations thereof. In certain preferred embodiments, the substrate is a polyurethane, polyethylene, or polymeric silicon layer.

Spray Gun

In theory, a spray gun used in a method of the present invention may be any apparatus that delivers an substantially uniform coating of hydrophilic or hydrophobic adhesive directly to the substrate. The spray gun apparatus should deliver an adjustable, essentially constant dose of adhesive to the substrate. In addition, the spray gun should not suffer from clogging which would interrupt delivery of the adhesive to the substrate. Spray guns that generally satisfy these conditions have been described. A spray gun that could be used to apply the adhesive in the present invention will now be described in both general and specific terms; however, one of ordinary skill will understand that a variety of spray guns or their equivalents may be used.

In many high-speed packaging applications, a plurality of continuous beads or intermittent unitary deposits of molten adhesive are simultaneously applied to moving sheets of material through a number of spray gun modules. One such example is described in U.S. Pat. No. Re. 27,865 assigned to Nordson Corp. It has proven to be advantageous to have the spray gun mounted so that the angular position of the individual guns can be adjusted as in the U.S. Pat. No. Re. 27,865. The repositioning of the spray guns by an angular adjustment can affect the spray pattern of the adhesive. See U.S. Pat. No. 5,265,800 for a related example.

Figure 3:
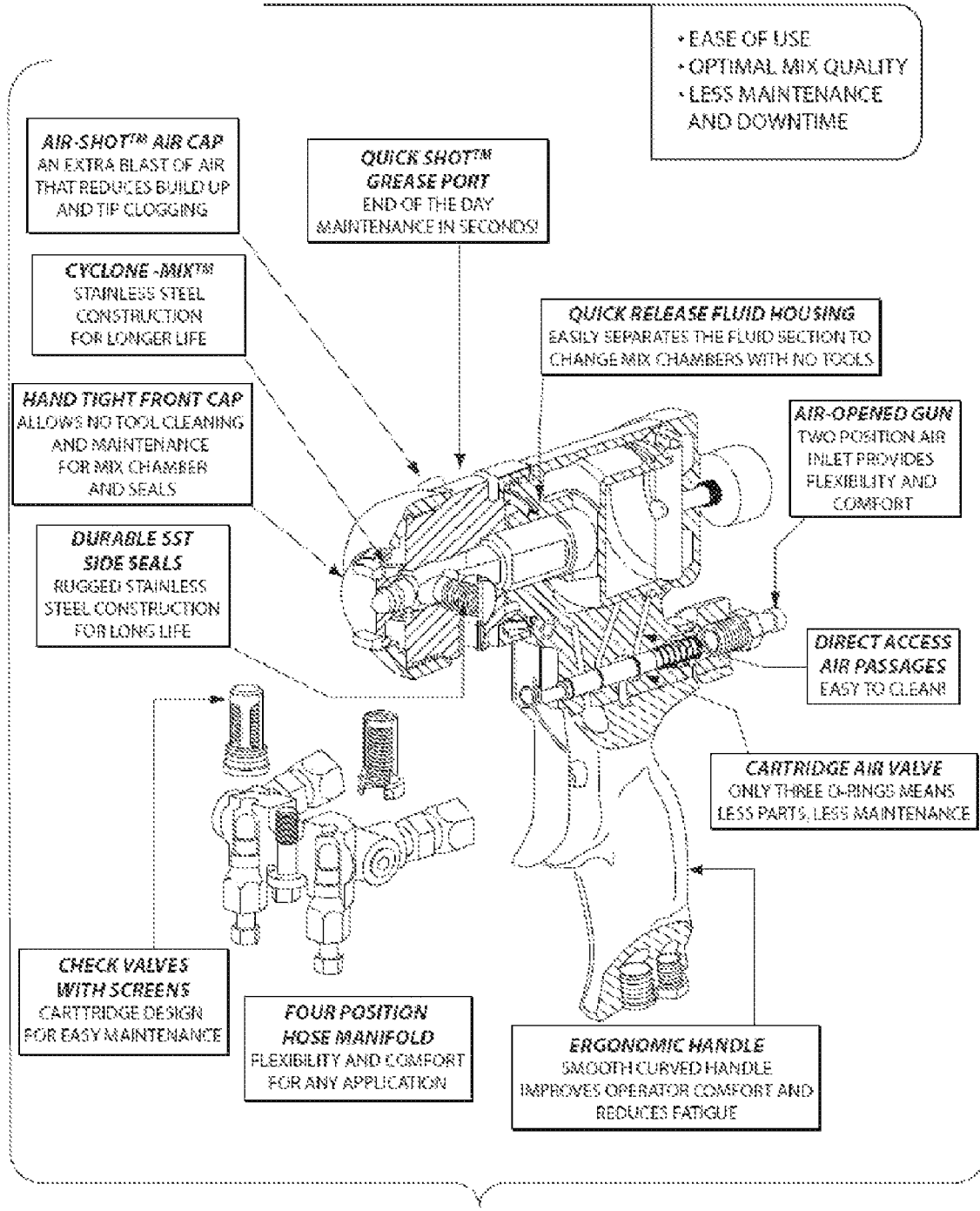
FIG. 3 depicts a spray gun for use with adhesives.

In the present invention, it would be advantageous to attach one or more spray gun modules having a preset range of adjustment to a fixed service manifold so that the spray pattern can be quickly, easily and accurately changed for different applications to obviate the problems and limitations of the aforementioned systems. Furthermore, it would be useful to attach one or more spray gun modules having a range of lateral adjustment via a mounting plate to a fixed service manifold so that the number and/or position of the spray gun modules can be quickly and easily changed and aligned with respect to each other and the substrate being sprayed for different applications. A diagram of some of the key components of such a spray gun is shown in FIG. 3.

DEFINITIONS

For convenience, certain terms employed in the specification, examples, and appended claims are collected here.

The articles "a" and "an" are used herein to refer to one or to more than one (i.e. to at least one) of the grammatical object of the article. By way of example, "an element" means one element or more than one element.

The term "casting surface" refers to a surface of a material (e.g. paper, wood, metal, plastic, or textile) that temporarily comes into contact with an adhesive on a material.

For purposes of this invention, the chemical elements are identified in accordance with the Periodic Table of the Elements, CAS version, Handbook of Chemistry and Physics, 67th Ed., 1986-87, inside cover.

Methods of the Invention

Casting Lamination Method

One aspect of the present invention relates to a method of bonding a first material to a second material, comprising the steps of:

applying an adhesive to a first material to give an adhesive coated mating surface, and applying a second material to said mating surface of said first material.

In certain embodiments, the present invention relates to the aforementioned method, wherein a roller, squeegee, brush, doctor blade, air knife, vibrator, gravity, ultrasonic, spray nozzle, or multiple dispensing nozzles is used to distribute said adhesive on said first material.

In certain embodiments, the present invention relates to the aforementioned method, wherein a roller is used to distribute said adhesive on said first material.

In certain embodiments, the present invention relates to the aforementioned method, wherein a roller is used to distribute said adhesive throughout said first material.

In certain embodiments, the present invention relates to the aforementioned method, wherein a spray nozzle is used to distribute said adhesive on said first material.

In certain embodiments, the present invention relates to the aforementioned method, wherein a spray nozzle is used to distribute said adhesive throughout said first material.

In certain embodiments, the present invention relates to the aforementioned method, further comprising the step of applying temporarily a casting surface to said adhesive coated mating surface.

In certain embodiments, the present invention relates to the aforementioned method, wherein said casting surface is a paper, polymeric film, or polyurethane foam.

In certain embodiments, the present invention relates to the aforementioned method, further comprising the step of separating said second material from said first material before said adhesive is completely cured and a third material and a fourth material is applied to said first and second materials, respectively; wherein said third material and said fourth material represent independently cotton, wool, silk, jute, linen, rayon, acetate, polyesters, polyethyleneterephthalate, polyamides, nylon, acrylics, olefins, aramids, azlons, glasses, fiberglass, modacrylics, novoloids, nytrils, rayons, sarans, spandex, vinal, vinyon, foams, films, foamed sheets, natural leathers, split hides, synthetic leathers, vinyl, urethane, polyurethane foam, polyurethane film, polyethylene, polymeric silicone layers, filtration membranes, polysulfones, polyimides, nitrocellulose, cellulose acetate, cellulose, regenerated cellulose, alginates, hydrocolloids, metalized films, foils, silicones, latex, polycarbonates, or a foam prepared from water, a surfactant, and a prepolymer mixture selected from the group consisting of branched alkyl-isocyanate-capped poly(ether), unbranched alkyl-isocyanate-capped poly(ether), branched aromatic-isocyanate-capped poly(ether), unbranched aromatic-isocyanate-capped poly(ether), branched alkyl-isocyanate-capped poly(ether)-poly(ester) copolymer, unbranched alkyl-isocyanate-capped poly(ether)-poly(ester) copolymer, branched aromatic-isocyanate-capped poly(ether)-poly(ester) copolymer, unbranched aromatic-isocyanate-capped poly(ether)-poly(ester) copolymer, and any one of them comprising a biodegradable moiety.

In certain embodiments, the present invention relates to the aforementioned method, wherein said third material and said fourth material represent independently a foam prepared from water, a surfactant, and a prepolymer mixture selected from the group consisting of Trepol®, HYPOL™, Prepol, Hydropol, Aquapol, and Urepol.

In certain embodiments, the present invention relates to the aforementioned method, wherein a fifth material is placed next to said first material on the side of said first material located opposite to said mating surface of said first material.

In certain embodiments, the present invention relates to the aforementioned method, wherein said fifth material is paper or plastic.

In certain embodiments, the present invention relates to the aforementioned method, wherein said first material is unrolled from a first spindle.

In certain embodiments, the present invention relates to the aforementioned method, wherein said second material is unrolled from a second spindle.

In certain embodiments, the present invention relates to the aforementioned method, wherein said first material is supported by a conveyer belt or a roller.

In certain embodiments, the present invention relates to the aforementioned method, wherein said second material is a foam prepared from water, a surfactant, and a prepolymer mixture selected from the group consisting of branched alkyl-isocyanate-capped poly(ether), unbranched alkyl-isocyanate-capped poly(ether), branched aromatic-isocyanate-capped poly(ether), unbranched aromatic-isocyanate-capped poly(ether), branched alkyl-isocyanate-capped poly(ether)-poly(ester) copolymer, unbranched alkyl-isocyanate-capped poly(ether)-poly(ester) copolymer, branched aromatic-isocyanate-capped poly(ether)-poly(ester) copolymer, unbranched aromatic-isocyanate-capped poly(ether)-poly(ester) copolymer, and any one of them comprising a biodegradable moiety.

In certain embodiments, the present invention relates to the aforementioned method, wherein said second material is a polyurethane foam prepared from water, a surfactant, and a prepolymer mixture selected from the group consisting of Trepol®, HYPOL™, Prepol, Hydropol, Aquapol, and Urepol.

In certain embodiments, the present invention relates to the aforementioned method, wherein said second material is a polyurethane foam prepared from water, a surfactant, and a prepolymer mixture selected from the group consisting of Trepol®, and HYPOL™.

In certain embodiments, the present invention relates to the aforementioned method, wherein said second material is a polyurethane foam prepared from Trepol®.

In certain embodiments, the present invention relates to the aforementioned method, wherein said adhesive consists essentially of water and a prepolymer mixture selected from the group consisting of branched alkyl-isocyanate-capped poly(ether), unbranched alkyl-isocyanate-capped poly(ether), branched aromatic-isocyanate-capped poly(ether), unbranched aromatic-isocyanate-capped poly(ether), branched alkyl-isocyanate-capped poly(ether)-poly(ester) copolymer, unbranched alkyl-isocyanate-capped poly(ether)-poly(ester) copolymer, branched aromatic-isocyanate-capped poly(ether)-poly(ester) copolymer, unbranched aromatic-isocyanate-capped poly(ether)-poly(ester) copolymer, and any one of them comprising a biodegradable moiety.

In certain embodiments, the present invention relates to the aforementioned method, wherein said adhesive consists essentially of water and a prepolymer mixture selected from the group consisting of Trepol®, HYPOL™, Prepol, Hydropol, Aquapol, and Urepol.

In certain embodiments, the present invention relates to the aforementioned method, wherein said adhesive consists essentially of water and a prepolymer mixture selected from the group consisting of Trepol®, and HYPOL™.

In certain embodiments, the present invention relates to the aforementioned method, wherein said adhesive consists essentially of water and Trepol®.

In certain embodiments, the present invention relates to the aforementioned method, wherein the composition of said adhesive is the same or similar to the composition of said second material.

In certain embodiments, the present invention relates to the aforementioned method, wherein said second material is a polyurethane foam prepared from Trepol®; and said adhesive consists essentially of water and Trepol®.

In certain embodiments, the present invention relates to the aforementioned method, wherein the thickness of said adhesive is less than about 0.5 inches.

In certain embodiments, the present invention relates to the aforementioned method, wherein the thickness of said adhesive is less than about 0.25 inches.

In certain embodiments, the present invention relates to the aforementioned method, wherein the thickness of said adhesive is less than about 0.1 inches.

In certain embodiments, the present invention relates to the aforementioned method, wherein the thickness of said adhesive is less than about 0.05 inches.

In certain embodiments, the present invention relates to the aforementioned method, wherein the thickness of said adhesive is less than about 0.025 inches.

In certain embodiments, the present invention relates to the aforementioned method, wherein the thickness of said adhesive is less than about 0.005 inches.

In certain embodiments, the present invention relates to the aforementioned method, wherein said first material is a plastic, metal-containing sheet, cellulose-containing material, glass, fiberglass, textile, latex, rubber, or silicone.

In certain embodiments, the present invention relates to the aforementioned method, wherein said first material is cotton, wool, silk, jute, linen, rayon, acetate, polyesters, polyethyleneterephthalate, polyamides, nylon, acrylics, olefins, aramids, azlons, glasses, fiberglass, modacrylics, novoloids, nytrils, rayons, sarans, spandex, vinal, vinyon, foams, films, foamed sheets, natural leathers, split hides, synthetic leathers, vinyl, urethane, polyurethane foam, polyurethane film, polyethylene, polymeric silicone layers, filtration membranes, polysulfones, polyimides, nitrocellulose, cellulose acetate, cellulose, regenerated cellulose, alginates, hydrocolloids, metalized films, foils, silicones, latex, polycarbonate, or combinations thereof.

In certain embodiments, the present invention relates to the aforementioned method, wherein said first material is cotton, wool, linen, rayon, acetate, polyesters, polyethyleneterephthalate, polyamides, nylon, acrylics, olefins, glasses, foams, films, foamed sheets, vinyl, urethane, polyurethane foam, polyurethane film, polyethylene, polymeric silicone layers, polyimides, polycarbonate, or combinations thereof.

In certain embodiments, the present invention relates to the aforementioned method, wherein said first material is polyurethane foam, polyurethane film, polyethylene, polymeric silicone layers, polycarbonate, or combinations thereof.

In certain embodiments, the present invention relates to the aforementioned method, wherein the composition of said first material is the same as or substantially similar to the composition of said second material.

Another aspect of the present invention relates to a method of bonding together a first material, second material, and third material comprising the steps of:

applying an adhesive to a first material to give an adhesive coated mating surface, applying a second material to said adhesive coated mating surface, and applying a third material to said second material, wherein said second material is permeable to said adhesive.

In certain embodiments, the present invention relates to the aforementioned method, wherein a roller, squeegee, brush, doctor blade, air knife, vibrator, gravity, ultrasonic, spray nozzle, or multiple dispensing nozzles is used to distribute said adhesive on said first material.

In certain embodiments, the present invention relates to the aforementioned method, wherein a roller, squeegee, brush, doctor blade, air knife, vibrator, gravity, ultrasonic, spray nozzle, or multiple dispensing nozzles is used to distribute said adhesive throughout said first material.

In certain embodiments, the present invention relates to the aforementioned method, wherein a roller is used to distribute said adhesive on said first material.

In certain embodiments, the present invention relates to the aforementioned method, wherein a spray nozzle is used to distribute said adhesive throughout said first material.

In certain embodiments, the present invention relates to the aforementioned method, further comprising the step of applying temporarily a casting surface to said adhesive coated mating surface.

In certain embodiments, the present invention relates to the aforementioned method, wherein said casting surface is a paper, polymeric film, or polyurethane foam.

In certain embodiments, the present invention relates to the aforementioned method, wherein said second material is cotton, wool, silk, jute, linen, rayon, acetate, polyesters, polyethyleneterephthalate, polyamides, nylon, acrylics, olefins, aramids, azlons, glasses, fiberglass, modacrylics, rayons, sarans, spandex, vinal, vinyon, foams, films, foamed sheets, natural leathers, split hides, synthetic leathers, vinyl, urethane, polyurethane, polyethylene, polymeric silicone layers, polysulfones, polyimides, nitrocellulose, cellulose acetate, cellulose, regenerated cellulose, alginates, hydrocolloids, metalized films, foils, silicones, latex, polycarbonate, or a combination thereof.

In certain embodiments, the present invention relates to the aforementioned method, wherein a fourth material is placed next to said first material on the side of said first material located opposite to said mating surface of said first material.

In certain embodiments, the present invention relates to the aforementioned method, wherein said fourth material is paper.

In certain embodiments, the present invention relates to the aforementioned method, wherein said first material is unrolled from a first spindle.

In certain embodiments, the present invention relates to the aforementioned method, wherein said third material is unrolled from a second spindle.

In certain embodiments, the present invention relates to the aforementioned method, wherein said first material is supported by a conveyer belt or a roller.

In certain embodiments, the present invention relates to the aforementioned method, wherein said third material is a foam prepared from water, a surfactant, and a prepolymer mixture selected from the group consisting of branched alkyl-isocyanate-capped poly(ether), unbranched alkyl-isocyanate-capped poly(ether), branched aromatic-isocyanate-capped poly(ether), unbranched aromatic-isocyanate-capped poly(ether), branched alkyl-isocyanate-capped poly(ether)-poly(ester) copolymer, unbranched alkyl-isocyanate-capped poly(ether)-poly(ester) copolymer, branched aromatic-isocyanate-capped poly(ether)-poly(ester) copolymer, unbranched aromatic-isocyanate-capped poly(ether)-poly(ester) copolymer, and any one of them comprising a biodegradable moiety.

In certain embodiments, the present invention relates to the aforementioned method, wherein said third material is a polyurethane foam prepared from water, a surfactant, and a prepolymer mixture selected from the group consisting of Trepol®, HYPOL™, Prepol, Hydropol, Aquapol, and Urepol.

In certain embodiments, the present invention relates to the aforementioned method, wherein said third material is a polyurethane foam prepared from water, a surfactant, and a prepolymer mixture selected from the group consisting of Trepol®, and HYPOL™.

In certain embodiments, the present invention relates to the aforementioned method, wherein said third material is a polyurethane foam prepared from Trepol®.

In certain embodiments, the present invention relates to the aforementioned method, wherein said adhesive consists essentially of water and a prepolymer mixture selected from the group consisting of branched alkyl-isocyanate-capped poly(ether), unbranched alkyl-isocyanate-capped poly(ether), branched aromatic-isocyanate-capped poly(ether), unbranched aromatic-isocyanate-capped poly(ether), branched alkyl-isocyanate-capped poly(ether)-poly(ester) copolymer, unbranched alkyl-isocyanate-capped poly(ether)-poly(ester) copolymer, branched aromatic-isocyanate-capped poly(ether)-poly(ester) copolymer, unbranched aromatic-isocyanate-capped poly(ether)-poly(ester) copolymer, and any one of them comprising a biodegradable moiety.

In certain embodiments, the present invention relates to the aforementioned method, wherein said adhesive consists essentially of water and a prepolymer mixture selected from the group consisting of Trepol®, HYPOL™, Prepol, Hydropol, Aquapol, and Urepol.

In certain embodiments, the present invention relates to the aforementioned method, wherein said adhesive consists essentially of water and a prepolymer mixture selected from the group consisting of Trepol®, and HYPOL™.

In certain embodiments, the present invention relates to the aforementioned method, wherein said adhesive consists essentially of water and Trepol®.

In certain embodiments, the present invention relates to the aforementioned method, wherein the composition of said adhesive is the same or similar to the composition of said third material.

In certain embodiments, the present invention relates to the aforementioned method, wherein said second material is a polyurethane foam prepared from Trepol®; and said adhesive consists essentially of water and Trepol®.

In certain embodiments, the present invention relates to the aforementioned method, wherein the thickness of said adhesive is less than about 0.5 inches.

In certain embodiments, the present invention relates to the aforementioned method, wherein the thickness of said adhesive is less than about 0.25 inches.

In certain embodiments, the present invention relates to the aforementioned method, wherein the thickness of said adhesive is less than about 0.1 inches.

In certain embodiments, the present invention relates to the aforementioned method, wherein the thickness of said adhesive is less than about 0.05 inches.

In certain embodiments, the present invention relates to the aforementioned method, wherein the thickness of said adhesive is less than about 0.025 inches.

In certain embodiments, the present invention relates to the aforementioned method, wherein the thickness of said adhesive is less than about 0.005 inches.

In certain embodiments, the present invention relates to the aforementioned method, wherein said first material is a plastic, metal-containing sheet, cellulose-containing material, glass, fiberglass, textile, latex, rubber, or silicone.

In certain embodiments, the present invention relates to the aforementioned method, wherein said first material is cotton, wool, silk, jute, linen, rayon, acetate, polyesters, polyethyleneterephthalate, polyamides, nylon, acrylics, olefins, aramids, azlons, glasses, fiberglass, modacrylics, novoloids, nytrils, rayons, sarans, spandex, vinal, vinyon, foams, films, foamed sheets, natural leathers, split hides, synthetic leathers, vinyl, urethane, polyurethane foam, polyurethane film, polyethylene, polymeric silicone layers, filtration membranes, polysulfones, polyimides, nitrocellulose, cellulose acetate, cellulose, regenerated cellulose, alginates, hydrocolloids, metalized films, foils, silicones, latex, polycarbonate, or combinations thereof.

In certain embodiments, the present invention relates to the aforementioned method, wherein said first material is cotton, wool, linen, rayon, acetate, polyesters, polyethyleneterephthalate, polyamides, nylon, acrylics, olefins, glasses, foams, films, foamed sheets, vinyl, urethane, polyurethane foam, polyurethane film, polyethylene, polymeric silicone layers, polyimides, polycarbonate, or combinations thereof.

In certain embodiments, the present invention relates to the aforementioned method, wherein said first material is polyurethane foam, polyurethane film, polyethylene, polymeric silicone layers, polycarbonate, or combinations thereof.

In certain embodiments, the present invention relates to the aforementioned method, wherein the composition of said first material is the same as or substantially similar to the composition of said third material.

Spray Lamination Method

One aspect of the present invention relates to a method of binding a first material to a second material, comprising the steps of:

applying an adhesive to the mating surface of said first material using a spray gun, and applying said second material to the mating surface of said first material, wherein second material is a hydrophilic or hydrophobic polyurethane foam.

In certain embodiments, the present invention relates to the aforementioned method, wherein a third material is placed beneath the first material.

In certain embodiments, the present invention relates to the aforementioned method, wherein said third material is a casting surface.

In certain embodiments, the present invention relates to the aforementioned method, wherein said first material is unrolled from a first spindle; and said second material is unrolled from a second spindle.

In certain embodiments, the present invention relates to the aforementioned method, wherein said first material is supported by a conveyer belt or a roller.

In certain embodiments, the present invention relates to the aforementioned method, wherein said second material is a hydrophilic polyurethane.

In certain embodiments, the present invention relates to the aforementioned method, wherein said second material is a hydrophobic polyurethane.

In certain embodiments, the present invention relates to the aforementioned method, wherein said second material is a foam prepared from water, a surfactant, and a prepolymer mixture selected from the group consisting of branched alkyl-isocyanate-capped poly(ether), unbranched alkyl-isocyanate-capped poly(ether), branched aromatic-isocyanate-capped poly(ether), unbranched aromatic-isocyanate-capped poly(ether), branched alkyl-isocyanate-capped poly(ether)-poly(ester) copolymer, unbranched alkyl-isocyanate-capped poly(ether)-poly(ester) copolymer, branched aromatic-isocyanate-capped poly(ether)-poly(ester) copolymer, unbranched aromatic-isocyanate-capped poly(ether)-poly(ester) copolymer, and any one of them comprising a biodegradable moiety.

In certain embodiments, the present invention relates to the aforementioned method, wherein said second material is a polyurethane foam prepared from water, a surfactant, and a prepolymer mixture selected from the group consisting of Trepol®, HYPOL™, Prepol, Hydropol, Aquapol, and Urepol.

In certain embodiments, the present invention relates to the aforementioned method, wherein said second material is a polyurethane foam prepared from water, a surfactant, and a prepolymer mixture selected from the group consisting of Trepol®, and HYPOL™.

In certain embodiments, the present invention relates to the aforementioned method, wherein said second material is a polyurethane foam prepared from Trepol®.

In certain embodiments, the present invention relates to the aforementioned method, wherein said adhesive consists essentially of water and a prepolymer mixture selected from the group consisting of branched alkyl-isocyanate-capped poly(ether), unbranched alkyl-isocyanate-capped poly(ether), branched aromatic-isocyanate-capped poly(ether), unbranched aromatic-isocyanate-capped poly(ether), branched alkyl-isocyanate-capped poly(ether)-poly(ester) copolymer, unbranched alkyl-isocyanate-capped poly(ether)-poly(ester) copolymer, branched aromatic-isocyanate-capped poly(ether)-poly(ester) copolymer, unbranched aromatic-isocyanate-capped poly(ether)-poly(ester) copolymer, and any one of them comprising a biodegradable moiety.

In certain embodiments, the present invention relates to the aforementioned method, wherein said adhesive consists essentially of water and a prepolymer mixture selected from the group consisting of Trepol®, HYPOL™, Prepol, Hydropol, Aquapol, and Urepol.

In certain embodiments, the present invention relates to the aforementioned method, wherein said adhesive consists essentially of water and a prepolymer mixture selected from the group consisting of Trepol®, and HYPOL™.

In certain embodiments, the present invention relates to the aforementioned method, wherein said adhesive consists essentially of water and Trepol®.

In certain embodiments, the present invention relates to the aforementioned method, wherein the composition of said adhesive is the same as or substantially similar to the composition of said second material.

In certain embodiments, the present invention relates to the aforementioned method, wherein said second material is prepared from the prepolymer mixture Trepol® and said adhesive consists essentially of water and Trepol®.

In certain embodiments, the present invention relates to the aforementioned method, wherein said second material is prepared from the prepolymer mixture HYPOL™ and said adhesive consists essentially of water and Trepol®.

In certain embodiments, the present invention relates to the aforementioned method, wherein said second material is prepared from the prepolymer mixture Trepol® and said adhesive consists essentially of water and HYPOL™.

In certain embodiments, the present invention relates to the aforementioned method, wherein said second material is prepared from the prepolymer mixture HYPOL™ and said adhesive consists essentially of water and HYPOL™.

In certain embodiments, the present invention relates to the aforementioned method, wherein said first material is selected from the group consisting of cotton, wool, silk, jute, linen, rayon, acetate, polyesters, polyethyleneterephthalate, polyamides, nylon, acrylics, olefins, aramids, azlons, glasses, fiberglass, modacrylics, novoloids, nytrils, rayons, sarans, spandex, vinal, vinyon, foams, films, foamed sheets, natural leathers, split hides, synthetic leathers, vinyl, urethane, filtration membranes, polysulfones, polyimides, nitrocellulose, cellulose acetate, cellulose, regenerated cellulose, alginates, hydrocolloids, metalized films, foils, silicones, latex, and polycarbonate, and combinations thereof.

In certain embodiments, the present invention relates to the aforementioned method, wherein said first material is selected from the group consisting of cotton, wool, linen, rayon, acetate, polyesters, polyethyleneterephthalate, polyamides, nylon, acrylics, olefins, aramids, glasses, fiberglass, modacrylics, foams, foamed sheets, cellulose, and polycarbonate, and combinations thereof.

Method of Forming Foam-Coated Article

One aspect of the present invention relates to a method of forming an article coated with a layer of hydrophilic foam, comprising the steps of:

applying a thin layer of hydrophilic polyurethane foam to a substrate, wherein said substrate is a textile or non-woven material, and said hydrophilic polyurethane foam is prepared from a prepolymer mixture selected from the group consisting of branched alkyl-isocyanate-capped poly(ether), unbranched alkyl-isocyanate-capped poly(ether), branched aromatic-isocyanate-capped poly(ether), unbranched aromatic-isocyanate-capped poly(ether), branched alkyl-isocyanate-capped poly(ether)-poly(ester) copolymer, unbranched alkyl-isocyanate-capped poly(ether)-poly(ester) copolymer, branched aromatic-isocyanate-capped poly(ether)-poly(ester) copolymer, unbranched aromatic-isocyanate-capped poly(ether)-poly(ester) copolymer, and any one of them comprising a biodegradable moiety.

In certain embodiments, the present invention relates to the aforementioned method, wherein said hydrophilic polyurethane foam is prepared from a prepolymer mixture selected from the group consisting of Trepol®, HYPOL™, Prepol, Hydropol, Aquapol, and Urepol.

In certain embodiments, the present invention relates to the aforementioned method, wherein said hydrophilic polyurethane foam is prepared from a prepolymer mixture selected from the group consisting of Trepol®, and HYPOL™.

In certain embodiments, the present invention relates to the aforementioned method, wherein a roller, squeegee, brush, doctor blade, air knife, vibrator, gravity, ultrasonic, spray nozzle, or multiple dispensing nozzles is used to distribute said adhesive on said substrate.

In certain embodiments, the present invention relates to the aforementioned method, wherein said substrate is unrolled from a first spindle.

In certain embodiments, the present invention relates to the aforementioned method, wherein said substrate is supported by a conveyer belt or a roller.

In certain embodiments, the present invention relates to the aforementioned method, wherein said substrate is a textile.

In certain embodiments, the present invention relates to the aforementioned method, wherein said substrate is a non-woven material.

In certain embodiments, the present invention relates to the aforementioned method, wherein said substrate is selected from the group consisting of cotton, wool, silk, jute, linen, rayon, acetate, polyesters, polyamides, nylon, olefins, aramids, azlons, modacrylics, novoloids, nytrils, rayons, spandex, vinal, foams, foamed sheets, natural leathers, split hides, synthetic leathers, urethane, filtration membranes, polysulfones, polyimides, nitrocellulose, cellulose acetate, cellulose, regenerated cellulose, alginate, hydrocolloid, and combinations thereof.

In certain embodiments, the present invention relates to the aforementioned method, wherein said substrate is selected from the group consisting of cotton, wool, linen, rayon, acetate, polyesters, polyamides, nylon, olefins, aramids, modacrylics, foams, foamed sheets, and cellulose, and combinations thereof.

In certain embodiments, the present invention relates to the aforementioned method, wherein said substrate is selected from the group consisting of cotton, wool, linen, rayon, or nylon.

In certain embodiments, the present invention relates to the aforementioned method, wherein said substrate is cotton.

In certain embodiments, the present invention relates to the aforementioned method, wherein said hydrophilic polyurethane foam is prepared from a prepolymer mixture selected from the group consisting of Trepol® and HYPOL™.

In certain embodiments, the present invention relates to the aforementioned method, wherein said hydrophilic polyurethane foam is prepared from a prepolymer mixture of Trepol®.

In certain embodiments, the present invention relates to the aforementioned method, wherein the thickness of said thin layer of hydrophilic polyurethane foam is less than about 0.5 inches.

In certain embodiments, the present invention relates to the aforementioned method, wherein the thickness of said thin layer of hydrophilic polyurethane foam is less than about 0.25 inches.

In certain embodiments, the present invention relates to the aforementioned method, wherein the thickness of said thin layer of hydrophilic polyurethane foam is less than about 0.1 inches.

In certain embodiments, the present invention relates to the aforementioned method, wherein the thickness of said thin layer of hydrophilic polyurethane foam is less than about 0.05 inches.

In certain embodiments, the present invention relates to the aforementioned method, wherein the thickness of said thin layer of hydrophilic polyurethane foam is less than about 0.025 inches.

In certain embodiments, the present invention relates to the aforementioned method, wherein the thickness of said thin layer of hydrophilic polyurethane foam is less than about 0.005 inches.

Apparatus of the Invention

Casting Method Apparatus

One aspect of the present invention relates to an apparatus for binding of a first material to a second material, wherein said apparatus comprises:

a first spindle that contains said first material and a second spindle that contains said second material; a roller which supports said first and second materials; a nozzle for application of an adhesive; a roller to distribute said adhesive; and a spindle to collect a product material.

Spraying Method Apparatus

One aspect of the present invention relates to an apparatus for binding of a first material to a second material, wherein said apparatus comprises:

a first spindle that contains said first material and a second spindle that contains said second material; a roller which supports said first and second materials; a spray gun for application of an adhesive; a roller to guide application of said second material; and a spindle to collect a product material.

Composite Foam-Substrate Materials

One aspect of the present invention relates to a composition comprising a first material bound to a second material by an adhesive,
wherein
first material is a plastic, metal-containing sheet, cellulose-containing material, glass, fiberglass, textile, latex, rubber, or silicone;
second material represents a first hydrophilic or hydrophobic polyurethane foam; and
adhesive represents a second hydrophilic or hydrophobic polyurethane foam.

In certain embodiments, the present invention relates to the aforementioned composition, wherein said second material is a polyurethane foam prepared from water, a surfactant, and a prepolymer mixture selected from the group consisting of branched alkyl-isocyanate-capped poly(ether), unbranched alkyl-isocyanate-capped poly(ether), branched aromatic-isocyanate-capped poly(ether), unbranched aromatic-isocyanate-capped poly(ether), branched alkyl-isocyanate-capped poly(ether)-poly(ester) copolymer, unbranched alkyl-isocyanate-capped poly(ether)-poly(ester) copolymer, branched aromatic-isocyanate-capped poly(ether)-poly(ester) copolymer, unbranched aromatic-isocyanate-capped poly(ether)-poly(ester) copolymer, and any one of them comprising a biodegradable moiety.

In certain embodiments, the present invention relates to the aforementioned composition, wherein said second material is a polyurethane foam prepared from water, a surfactant, and a prepolymer mixture selected from the group consisting of Trepol®, HYPOL™, Prepol, Hydropol, Aquapol, and Urepol.

In certain embodiments, the present invention relates to the aforementioned composition, wherein said second material is a polyurethane foam prepared from water, a surfactant, and a prepolymer mixture selected from the group consisting of Trepol® and HYPOL™.

In certain embodiments, the present invention relates to the aforementioned composition, wherein said second material is a polyurethane foam prepared from Trepol®.

In certain embodiments, the present invention relates to the aforementioned composition, wherein said adhesive consists essentially of water and a prepolymer mixture selected from the group consisting of branched alkyl-isocyanate-capped poly(ether), unbranched alkyl-isocyanate-capped poly(ether), branched aromatic-isocyanate-capped poly(ether), unbranched aromatic-isocyanate-capped poly(ether), branched alkyl-isocyanate-capped poly(ether)-poly(ester) copolymer, unbranched alkyl-isocyanate-capped poly(ether)-poly(ester) copolymer, branched aromatic-isocyanate-capped poly(ether)-poly(ester) copolymer, unbranched aromatic-isocyanate-capped poly(ether)-poly(ester) copolymer, and any one of them comprising a biodegradable moiety.

In certain embodiments, the present invention relates to the aforementioned composition, wherein said adhesive consists essentially of water and a prepolymer mixture selected from the group consisting of Trepol®, HYPOL™, Prepol, Hydropol, Aquapol, and Urepol.

In certain embodiments, the present invention relates to the aforementioned composition, wherein said adhesive consists essentially of water and a prepolymer mixture selected from the group consisting of Trepol® and HYPOL™.

In certain embodiments, the present invention relates to the aforementioned composition, wherein said adhesive consists essentially of water and Trepol®.

In certain embodiments, the present invention relates to the aforementioned composition, wherein the composition of said adhesive foam is the same as or substantially similar to the composition of said second material.

In certain embodiments, the present invention relates to the aforementioned composition, wherein said second material is prepared from the prepolymer mixture Trepol® and said adhesive consists essentially of water and Trepol®.

In certain embodiments, the present invention relates to the aforementioned composition, wherein said second material is prepared from the prepolymer mixture HYPOL™ and said adhesive consists essentially of water and Trepol®.

In certain embodiments, the present invention relates to the aforementioned composition, wherein said second material is prepared from the prepolymer mixture Trepol® and said adhesive consists essentially of water and HYPOL™.

In certain embodiments, the present invention relates to the aforementioned composition, wherein said second material is prepared from the prepolymer mixture HYPOL™ and said adhesive consists essentially of water and HYPOL™.

In certain embodiments, the present invention relates to the aforementioned composition, wherein the thickness of said adhesive is less than about 0.5 inches.

In certain embodiments, the present invention relates to the aforementioned composition, wherein the thickness of said adhesive is less than about 0.25 inches.

In certain embodiments, the present invention relates to the aforementioned composition, wherein the thickness of said adhesive is less than about 0.1 inches.

In certain embodiments, the present invention relates to the aforementioned composition, wherein the thickness of said adhesive is less than about 0.05 inches.

In certain embodiments, the present invention relates to the aforementioned composition, wherein the thickness of said adhesive is less than about 0.025 inches.

In certain embodiments, the present invention relates to the aforementioned composition, wherein the thickness of said adhesive is less than about 0.005 inches.

In certain embodiments, the present invention relates to the aforementioned composition, wherein said first material is selected from the group consisting of cotton, wool, silk, jute, linen, rayon, acetate, polyesters, polyethyleneterephthalate, polyamides, nylon, acrylics, olefins, aramids, azlons, glasses, fiberglass, modacrylics, novoloids, nytrils, rayons, sarans, spandex, vinal, vinyon, foams, films, foamed sheets, natural leathers, split hides, synthetic leathers, vinyl, urethane, filtration membranes, polysulfones, polyimides, nitrocellulose, cellulose acetate, cellulose, regenerated cellulose, alginates, hydrocolloids, metalized films, foils, silicones, latex, and polycarbonate, and combinations thereof.

In certain embodiments, the present invention relates to the aforementioned composition, wherein said first material is selected from the group consisting of cotton, wool, linen, rayon, acetate, polyesters, polyethyleneterephthalate, polyamides, nylon, acrylics, olefins, aramids, glasses, fiberglass, modacrylics, foams, foamed sheets, and cellulose, and combinations thereof.

In certain embodiments, the present invention relates to the aforementioned composition, wherein said first material is polyurethane foam, polyurethane film, polyethylene, polymeric silicone layers, or combinations thereof.

In certain embodiments, the present invention relates to the aforementioned composition, wherein the composition of said first material is the same as or substantially similar to the composition of said second material.

In certain embodiments, the present invention relates to the aforementioned composition, wherein said first material is a hydrophilic polyurethane foam, said second material is a hydrophilic polyurethane foam; and said adhesive is a hydrophilic polyurethane foam.

In certain embodiments, the present invention relates to the aforementioned composition, further comprising a third material selected from the group consisting of fabrics composed of natural fibers and fabrics composed of synthetic fibers.

In certain embodiments, the present invention relates to the aforementioned composition, wherein said third material is a natural gauze or synthetic gauze.

In certain embodiments, the present invention relates to the aforementioned composition, wherein said third material is positioned between said first material and said second material.

In certain embodiments, the present invention relates to the aforementioned composition, wherein said third material is not positioned between said first material and said second material.

Another aspect of the present invention relates to a composition comprising a substrate coated with a thin layer of a hydrophilic polyurethane foam prepared from water, a surfactant, and a prepolymer mixture selected from the group consisting of branched alkyl-isocyanate-capped poly(ether), unbranched alkyl-isocyanate-capped poly(ether), branched aromatic-isocyanate-capped poly(ether), unbranched aromatic-isocyanate-capped poly(ether), branched alkyl-isocyanate-capped poly(ether)-poly(ester) copolymer, unbranched alkyl-isocyanate-capped poly(ether)-poly(ester) copolymer, branched aromatic-isocyanate-capped poly(ether)-poly(ester) copolymer, unbranched aromatic-isocyanate-capped poly(ether)-poly(ester) copolymer, and any one of them comprising a biodegradable moiety; wherein said substrate is a textile or non-woven material.

In certain embodiments, the present invention relates to the aforementioned composition, wherein said hydrophilic polyurethane foam prepared from water, a surfactant, and a prepolymer mixture selected from the group Trepol®, HYPOL™, Prepol, Hydropol, Aquapol, and Urepol.

In certain embodiments, the present invention relates to the aforementioned composition, wherein said substrate is a textile.

In certain embodiments, the present invention relates to the aforementioned composition, wherein said substrate is a non-woven material.

In certain embodiments, the present invention relates to the aforementioned composition, wherein said substrate is selected from the group consisting of cotton, wool, silk, jute, linen, rayon, acetate, polyesters, polyamides, nylon, olefins, aramids, azlons, modacrylics, novoloids, nytrils, rayons, spandex, vinal, foams, foamed sheets, natural leathers, split hides, synthetic leathers, urethane, filtration membranes, polysulfones, polyimides, nitrocellulose, cellulose acetate, cellulose, regenerated cellulose, alginate, and hydrocolloid, and combinations thereof.

In certain embodiments, the present invention relates to the aforementioned composition, wherein said substrate is selected from the group consisting of cotton, wool, linen, rayon, acetate, polyesters, polyamides, nylon, olefins, aramids, modacrylics, foams, foamed sheets, and cellulose, and combinations thereof.

In certain embodiments, the present invention relates to the aforementioned composition, wherein said substrate is selected from the group consisting of cotton, wool, linen, rayon, or nylon.

In certain embodiments, the present invention relates to the aforementioned composition, wherein said substrate is cotton.

In certain embodiments, the present invention relates to the aforementioned composition, wherein said thin layer of hydrophilic polyurethane foam is prepared from a prepolymer mixture selected from the group consisting of Trepol®, HYPOL™, and Prepol.

In certain embodiments, the present invention relates to the aforementioned composition, wherein said thin layer of hydrophilic polyurethane foam is prepared from a prepolymer mixture of Trepol®.

In certain embodiments, the present invention relates to the aforementioned composition, wherein the thickness of said thin layer of hydrophilic polyurethane foam is less than about 0.5 inches.

In certain embodiments, the present invention relates to the aforementioned composition, wherein the thickness of said thin layer of hydrophilic polyurethane foam is less than about 0.25 inches.

In certain embodiments, the present invention relates to the aforementioned composition, wherein the thickness of said thin layer of hydrophilic polyurethane foam is less than about 0.1 inches.

In certain embodiments, the present invention relates to the aforementioned composition, wherein the thickness of said thin layer of hydrophilic polyurethane foam is less than about 0.05 inches.

In certain embodiments, the present invention relates to the aforementioned composition, wherein the thickness of said thin layer of hydrophilic polyurethane foam is less than about 0.025 inches.

In certain embodiments, the present invention relates to the aforementioned composition, wherein the thickness of said thin layer of hydrophilic polyurethane foam is less than about 0.005 inches.

EXEMPLIFICATION

The invention now being generally described, it will be more readily understood by reference to the following examples, which are included merely for purposes of illustration of certain aspects and embodiments of the present invention, and are not intended to limit the invention.

Example 1

Preparation of Composite Foam by the Casting Method

Figure 4:
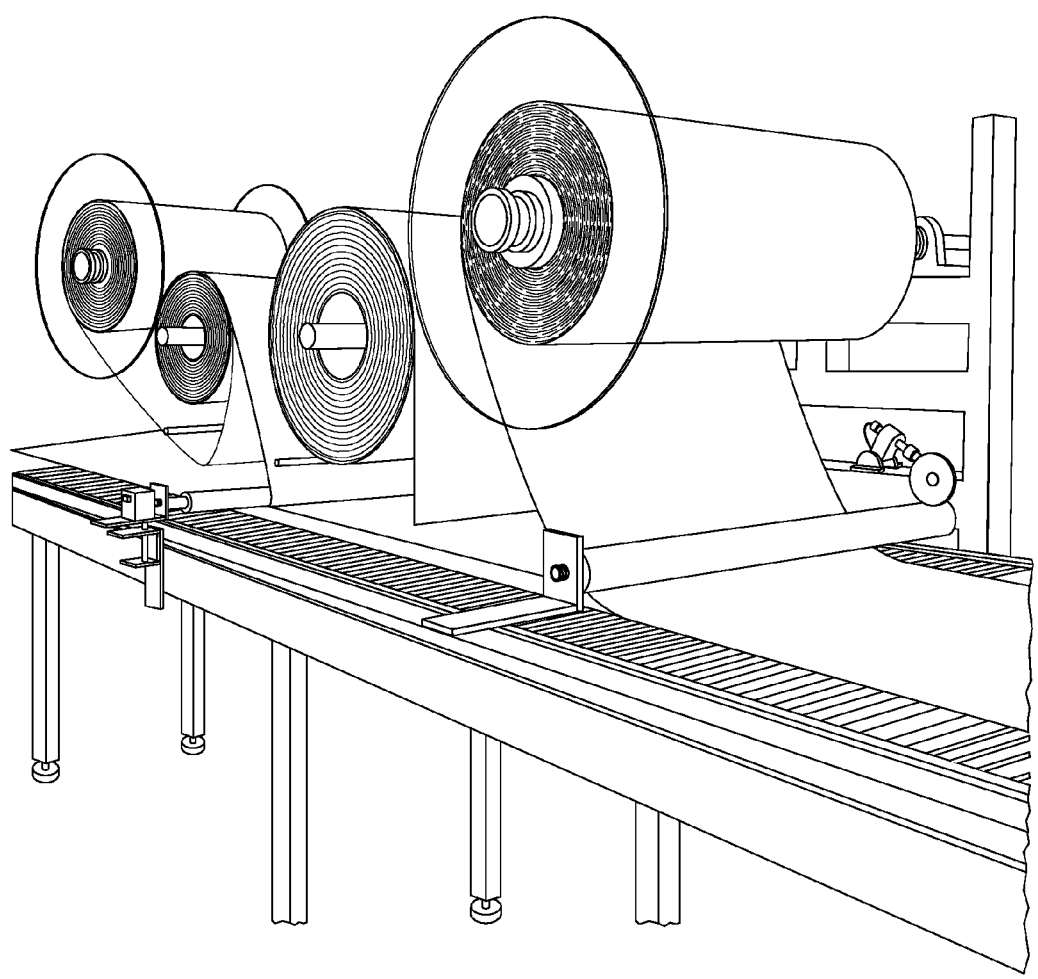
FIG. 4 is a photograph of an embodiment of the apparatus of the present invention.
Figure 5:
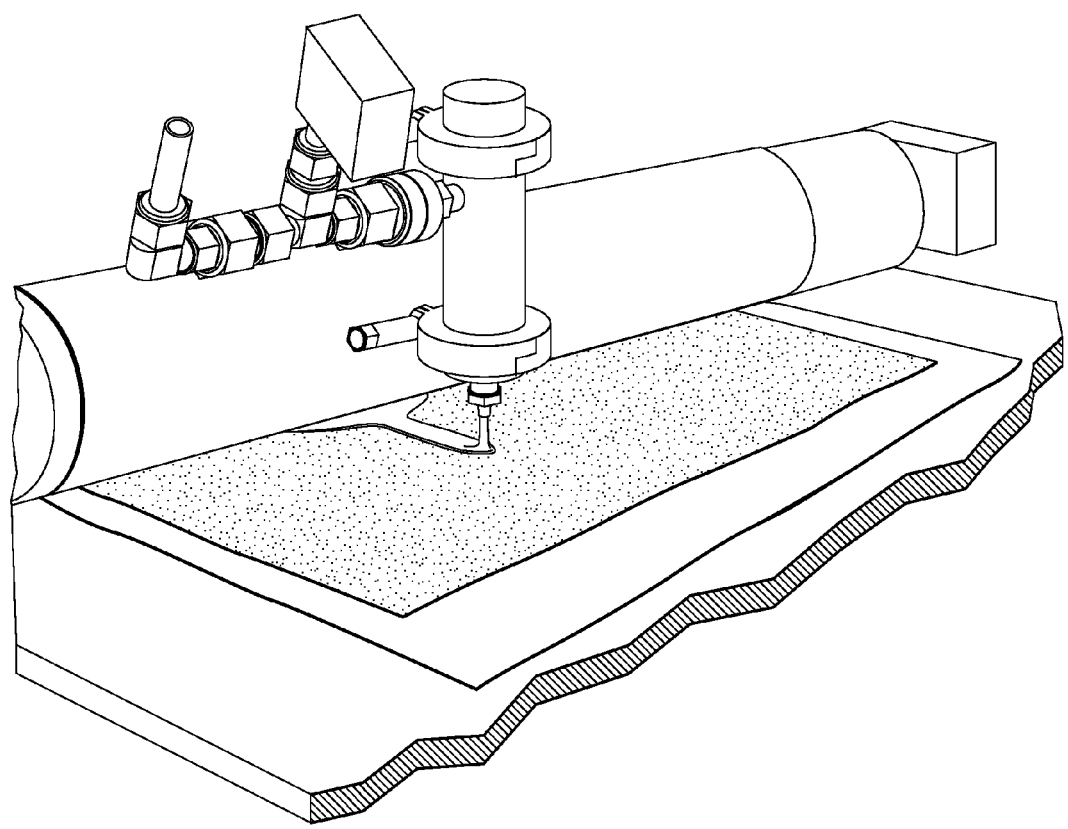
FIG. 5 is a photograph of an embodiment of the apparatus of the present invention.

A method to bind a substrate to a foam using an adhesive is illustrated in FIGS. 1, 4, and 5. The material to be laminated to the foam is orientated such that the "side-to-be-adhered-to" is facing upright and said material resides on top of the carrier (e.g. casting paper) on the production line. The casting surface and laminate material are thus being pulled underneath the foam dispensing head of the foam line. Rynel medical prepolymer (Trepol®) is combined with an aqueous solution in the mixing head in a predetermined ratio (typically 1:1 or 1:1.2) and dispensed onto the "upside" of the laminate material. A top layer of casting surface is then continuously applied to make a sandwich consisting of: bottom casting surface, laminate material, dispensed Trepol® based foam and top layer of casting surface. All layers are being pulled at the same rate presenting a static interface of the layers. The sandwich is pulled underneath a roller that spreads the dispensed adhesive foam material. The dispensed foam reacts and begins to cure. The top casting surface is pulled away from the sandwich at a point where the dispensed adhesive foam is still "sticky." The previously made foam material is laid down on the "open sandwich" and then pressure is applied using a roller. The "new sandwich" consists of: bottom casting surface, laminate material, dispensed Trepol® based foam and top layer of pre-made foam. The sandwich continues down the length of the casting line while the dispensed foam (adhesive) continues to cure and cross link adhering the laminate material to the pre-made foam. The bottom carrier is removed at the end of the production line and the sandwich (laminate material, dispensed foam (adhesive) and pre-made foam is rolled up ready for slitting, die cutting etc.

Example 2

Spraying Method

Figure 2:
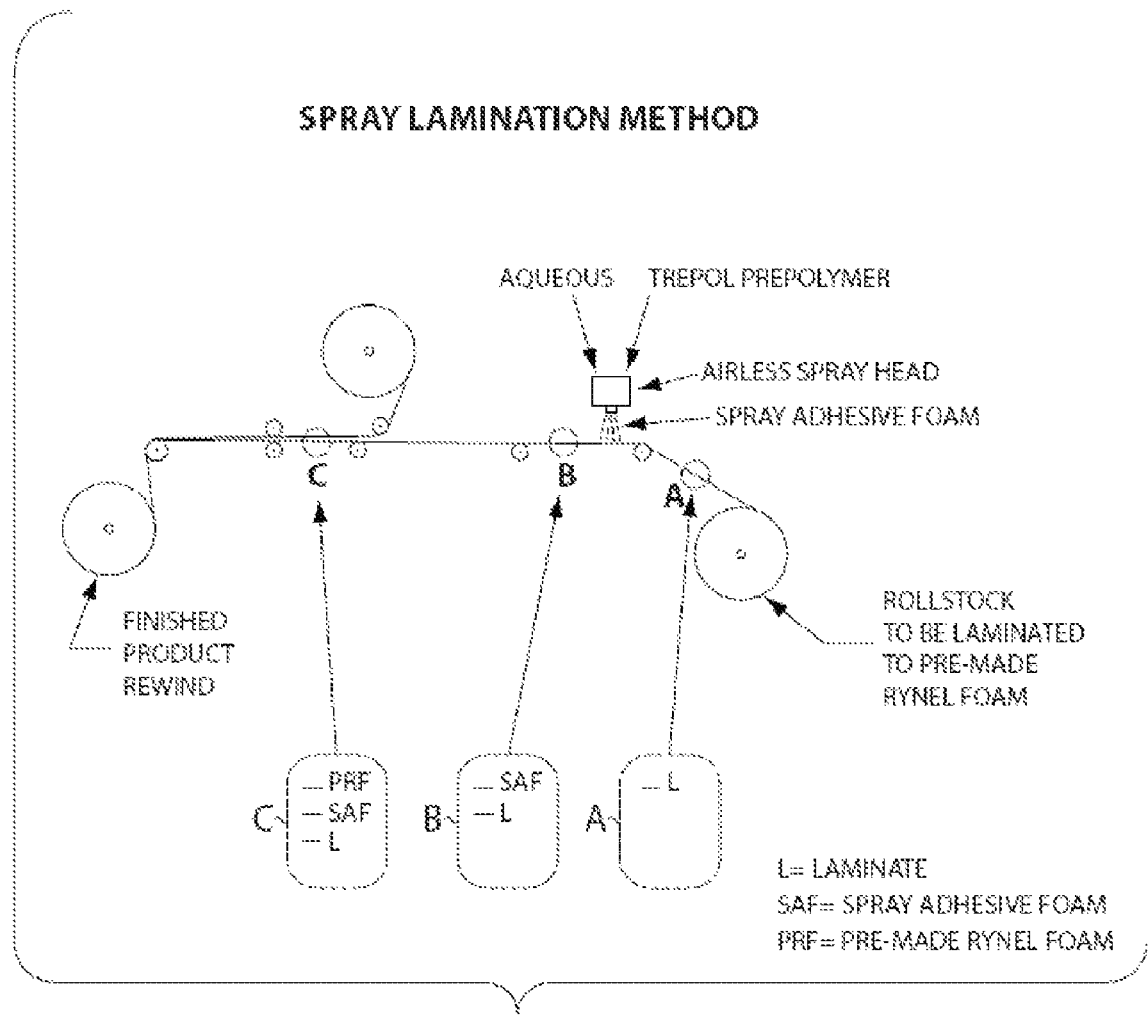
FIG. 2 depicts a schematic drawing of the Spray Method.

As depicted in FIG. 2, the material to be laminated to the foam is orientated such that the "side-to-be-adhered-to" is facing upright. The Rynel medical prepolymer (Trepol®) is combined with an aqueous solution in the spray head in a predetermined ratio (typically 1:1 or 1:1.2) and dispensed onto the "upside" of the laminate material via a spray gun. The dispensed foam reacts and begins to cure. Next, the previously made foam material is laid down on top of the polymeric adhesive mixture and pressure is applied using a roller. The composite material continues down the length of the production line while the adhesive continues to cure and cross link thereby binding the laminate material to the pre-made foam. The pre-made foam is rolled up ready for slitting, die cutting etc.

Example 3

The moisture vapor transmission rate (MVTR) of a sample of 4005 Polyurethane foam coated with a layer of Trepol® based foam was determined using the following method. The layer of 4005 Polyurethane foam obtained from Scapa UK Limited was approximately 0.4 mm thick.

A sample cut from a dressing was applied to the upper flange of a Paddington Cup and fixed securely in place with the retaining ring. A 0.9% saline solution is added to the cup, which is then securely sealed and weighed. The cup is then inverted onto a screen support in a tray containing silica gel absorbent and placed in a 37° C. incubator for 24 hours after which the cup is removed from the incubator and allowed to equilibrate to room temperature and re-weighed. The loss in weight due to moisture vapor transmission is used to calculate the MVTR. The MVTR data is presented below.

| | methode code PH 311/017 MVTR inverted, 4 h | | | |
|---|---|---|---|---|
| | Rynel's laminate sample, high "adhesive" mvtr | | | |
| sample no | cup weight t = 0, g | cup weight t = 4 h, g | 4 h g/m² | 24 h g/m² |
| 1 | 638.48 | 637.25 | 1230 | 7380 |
| 2 | 639.25 | 637.23 | 2020 | 12120 |
| 3 | 637.53 | 634.03 | 3500 | 21000 |
| 4 | 633.28 | 632.07 | 1210 | 7260 |
| 5 | 642.64 | 639.32 | 3320 | 19920 |
| 6 | 638.62 | 635.04 | 3580 | 21480 |
| 7 | 637.9 | 636.35 | 1550 | 9300 |
| 8 | 636.63 | 635.16 | 1470 | 8820 |
| 9 | 639.26 | 635.46 | 3800 | 22800 |
| 10 | 635.36 | 632.55 | 2810 | 16860 |
| | | x | 2449 | 14694 |
| | | min | 1210 | |
| | | max | 3800 | |
| | | max − min | 2590 | |
| | | % of mean | 105.8 | |

| | | | | Inverted | | | | |
|---|---|---|---|---|---|---|---|---|
| MVTR, paddington cup, inverted | | | | | | | | Mean Rynel Charge |
| Lot No. | Weight of cup after t = 0 | weight of cup after 4 h | mvtr 4 h g/m² | mean (g/m²) | Standard Dev. | Diff. min/max | % deviat. from mean | per 24 h inverted g/m² |
| D083-27834 | 626.81 | 625.04 | 1770 | 1800 | 384 | 930 | 51.7 | 10800 |
| D083-27834 | 636.98 | 635.64 | 1340 | | | | | |
| D083-27834 | 641.42 | 640.06 | 1360 | | | | | |
| D083-27834 | 633.73 | 631.66 | 2070 | | | | | |
| D083-27834 | 636.54 | 634.55 | 1990 | | | | | |
| D083-27834 | 639.14 | 636.87 | 2270 | | | | | |
| D083-27836 | 639.21 | 637.05 | 2160 | 3547 | 1275 | 2750 | 77.5 | 21280 |
| D083-27836 | 638.07 | 633.33 | 4740 | | | | | |
| D083-27836 | 645.32 | 640.87 | 4450 | | | | | |
| D083-27836 | 642.99 | 641.27 | 1720 | | | | | |
| D083-27836 | 638.45 | 634.31 | 4140 | | | | | |
| D083-27836 | 637.99 | 633.92 | 4070 | | | | | |
| F273-48084 | 638.83 | 637.86 | 970 | 1817 | 812 | 2060 | 113.4 | 10900 |
| F273-48084 | 636.73 | 635.64 | 1090 | | | | | |
| F273-48084 | 635.70 | 634.35 | 1350 | | | | | |
| F273-48084 | 637.67 | 635.55 | 2120 | | | | | |
| F273-48084 | 639.75 | 637.41 | 2340 | | | | | |
| F273-48084 | 639.00 | 635.97 | 3030 | | | | | |
| F273-38084 | 631.10 | 629.76 | 1340 | 1123 | 482 | 1280 | 113.9 | 6740 |
| F273-38084 | 636.32 | 634.35 | 1970 | | | | | |
| F273-38084 | 641.00 | 639.89 | 1110 | | | | | |
| F273-38084 | 633.29 | 632.37 | 920 | | | | | |
| F273-38084 | 636.33 | 635.62 | 710 | | | | | |
| F273-38084 | 638.91 | 638.22 | 690 | | | | | |
| D283-47893 | 639.05 | 636.35 | 2700 | 3082 | 600 | 1760 | 57.1 | 18490 |
| D283-47893 | 638.15 | 635.95 | 2200 | | | | | |
| D283-47893 | 645.51 | 641.55 | 3960 | | | | | |
| D283-47893 | 643.26 | 640.24 | 3020 | | | | | |

-continued

| methode code PH 311/017 MVTR inverted, 4 h | | | | | | | | |
|---|---|---|---|---|---|---|---|---|
| D283-47893 | 638.51 | 635.17 | 3340 | | | | | |
| D283-47893 | 637.87 | 634.60 | 3270 | | | | | |
| F273-48086 | 638.80 | 637.66 | 1140 | 1198 | 87 | 220 | 18.4 | 7190 |
| F273-48086 | 637.18 | 636.02 | 1160 | | | | | |
| F273-48086 | 636.15 | 635.05 | 1100 | | | | | |
| F273-48086 | 638.11 | 636.82 | 1290 | | | | | |
| F273-48086 | 639.98 | 638.80 | 1180 | | | | | |
| F273-48086 | 639.36 | 638.04 | 1320 | | | | | |

INCORPORATION BY REFERENCE

All of the patents and publications cited herein are hereby incorporated by reference.

EQUIVALENTS

Those skilled in the art will recognize, or be able to ascertain using no more than routine experimentation, many equivalents to the specific embodiments of the invention described herein. Such equivalents are intended to be encompassed by the following claims.

We claim:

1. A method of bonding a first material to a second material, comprising the steps of:
    (a) applying an adhesive foam to a first material to give an adhesive coated mating surface;
    (b) applying a second material to said adhesive coated mating surface of said first material; and
    (c) applying temporarily a casting surface to said adhesive coated mating surface,
    wherein said second material is a foam prepared from water and a prepolymer mixture selected from the group consisting of branched alkyl-isocyanate-capped poly(ether), unbranched alkyl-isocyanate-capped poly(ether), branched aromatic-isocyanate-capped poly(ether), unbranched aromatic-isocyanate-capped poly(ether), branched alkyl-isocyanate-capped poly(ether)-poly(ester) copolymer, unbranched alkyl-isocyanate-capped poly(ether)-poly(ester) copolymer, branched aromatic-isocyanate-capped poly(ether)-poly(ester) copolymer, and unbranched aromatic-isocyanate-capped poly(ether)-poly(ester) copolymer; and
    said adhesive foam is a foam prepared from water and a prepolymer mixture selected from the group consisting of branched alkyl-isocyanate-capped poly(ether), unbranched alkyl-isocyanate-capped poly(ether), branched aromatic-isocyanate-capped poly(ether), unbranched aromatic-isocyanate-capped poly(ether), branched alkyl-isocyanate-capped poly(ether)-poly(ester) copolymer, unbranched alkyl-isocyanate-capped poly(ether)-poly(ester) copolymer, branched aromatic-isocyanate-capped poly(ether)-poly(ester) copolymer, and unbranched aromatic-isocyanate-capped poly(ether)-poly(ester) copolymer.

2. The method of claim 1, wherein said casting surface is a paper, polymeric film, or polyurethane foam.

3. A method of bonding a first material to a second material, comprising the steps of:
    (a) applying an adhesive foam to a first material to give an adhesive coated mating surface;
    (b) applying a second material to said adhesive coated mating surface of said first material;
    (c) separating said second material from said first material before said adhesive is completely cured; and
    (d) applying a third material and a fourth material to said first and second materials, respectively,
    wherein said second material is a foam prepared from water and a prepolymer mixture selected from the group consisting of branched alkyl-isocyanate-capped poly(ether), unbranched alkyl-isocyanate-capped poly(ether), branched aromatic-isocyanate-capped poly(ether), unbranched aromatic-isocyanate-capped poly(ether), branched alkyl-isocyanate-capped poly(ether)-poly(ester) copolymer, unbranched alkyl-isocyanate-capped poly(ether)-poly(ester) copolymer, branched aromatic-isocyanate-capped poly(ether)-poly(ester) copolymer, and unbranched aromatic-isocyanate-capped poly(ether)-poly(ester) copolymer;
    said adhesive foam is a foam prepared from water and a prepolymer mixture selected from the group consisting of branched alkyl-isocyanate-capped poly(ether), unbranched alkyl-isocyanate-capped poly(ether), branched aromatic-isocyanate-capped poly(ether), unbranched aromatic-isocyanate-capped poly(ether), branched alkyl-isocyanate-capped poly(ether)-poly(ester) copolymer, unbranched alkyl-isocyanate-capped poly(ether)-poly(ester) copolymer, branched aromatic-isocyanate-capped poly(ether)-poly(ester) copolymer, and unbranched aromatic-isocyanate-capped poly(ether)-poly(ester) copolymer; and
    said third material and said fourth material are independently cotton, wool, silk, jute, linen, rayon, acetate, polyesters, polyethyleneterephthalate, polyamides, nylon, acrylics, olefins, aramids, azlons, glasses, fiberglass, modacrylics, novoloids, nytrils, rayons, sarans, spandex, vinal, vinyon, foams, films, foamed sheets, natural leathers, split hides, synthetic leathers, vinyl, urethane, polyurethane foam, polyurethane film, polyethylene, polymeric silicone layers, filtration membranes, polysulfones, polyimides, nitrocellulose, cellulose acetate, cellulose, regenerated cellulose, alginates, hydrocolloids, metalized films, foils, silicones, latex, polycarbonates, or a foam prepared from water and a prepolymer mixture selected from the group consisting of branched alkyl-isocyanate-capped poly(ether), unbranched alkyl-isocyanate-capped poly(ether), branched aromatic-isocyanate-capped poly(ether), unbranched aromatic-isocyanate-capped poly(ether), branched alkyl-isocyanate-capped poly(ether)-poly(ester) copolymer, unbranched alkyl-isocyanate-capped poly(ether)-poly(ester) copolymer, branched aromatic-isocyanate-capped poly(ether)-poly(ester) copolymer, and unbranched aromatic-isocyanate-capped poly(ether)-poly(ester) copolymer.

4. A method of bonding a first material to a second material, comprising the steps of:
    (a) applying an adhesive foam to a first material to give an adhesive coated mating surface;
    (b) applying a second material to said adhesive coated mating surface of said first material; and
    (c) applying a third material to said second material,
    wherein said second material is a foam prepared from water and a prepolymer mixture selected from the group consisting of branched alkyl-isocyanate-capped poly(ether), unbranched alkyl-isocyanate-capped poly(ether), branched aromatic-isocyanate-capped poly(ether), unbranched aromatic-isocyanate-capped poly(ether), branched alkyl-isocyanate-capped poly(ether)-poly(ester) copolymer, unbranched alkyl-isocyanate-capped poly(ether)-poly(ester) copolymer, branched aromatic-isocyanate-capped poly(ether)-poly(ester) copolymer, and unbranched aromatic-isocyanate-capped poly(ether)-poly(ester) copolymer;

said adhesive foam is a foam prepared from water and a prepolymer mixture selected from the group consisting of branched alkyl-isocyanate-capped poly(ether), unbranched alkyl-isocyanate-capped poly(ether), branched aromatic-isocyanate-capped poly(ether), unbranched aromatic-isocyanate-capped poly(ether), branched alkyl-isocyanate-capped poly(ether)-poly(ester) copolymer, unbranched alkyl-isocyanate-capped poly(ether)-poly(ester) copolymer, branched aromatic-isocyanate-capped poly(ether)-poly(ester) copolymer, and unbranched aromatic-isocyanate-capped poly(ether)-poly(ester) copolymer;

said second material is permeable to said adhesive foam; and said third material is a foam prepared from water and a prepolymer mixture selected from the group consisting of branched alkyl-isocyanate-capped poly(ether), unbranched alkyl-isocyanate-capped poly(ether), branched aromatic-isocyanate-capped poly(ether), unbranched aromatic-isocyanate-capped poly(ether), branched alkyl-isocyanate-capped poly(ether)-poly(ester) copolymer, unbranched alkyl-isocyanate-capped poly(ether)-poly(ester) copolymer, branched aromatic-isocyanate-capped poly(ether)-poly(ester) copolymer, and unbranched aromatic-isocyanate-capped poly(ether)-poly(ester) copolymer.

5. The method of claim 4, wherein the composition of said first material is the same as the composition of said third material.

\* \* \* \* \*